(No Model.) 2 Sheets—Sheet 1.
T. L. JOHNSON.
DOUBLE CABLE FOR CABLE RAILWAYS.
No. 310,285. Patented Jan. 6, 1885.
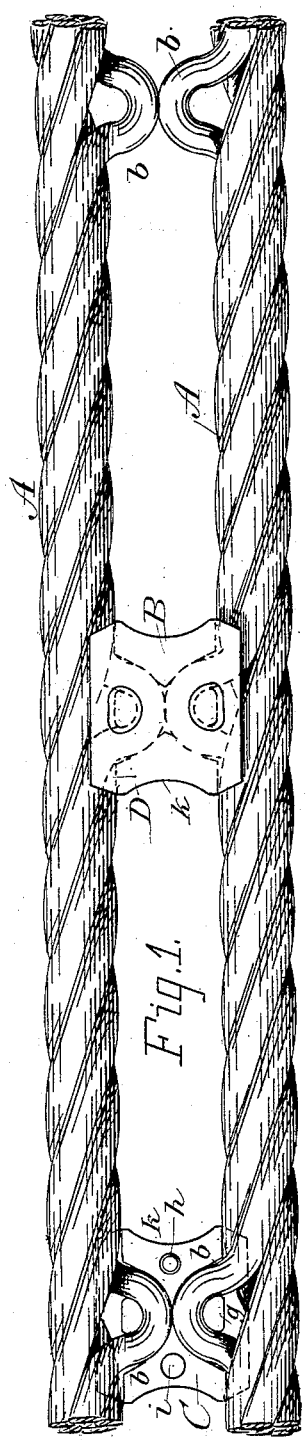
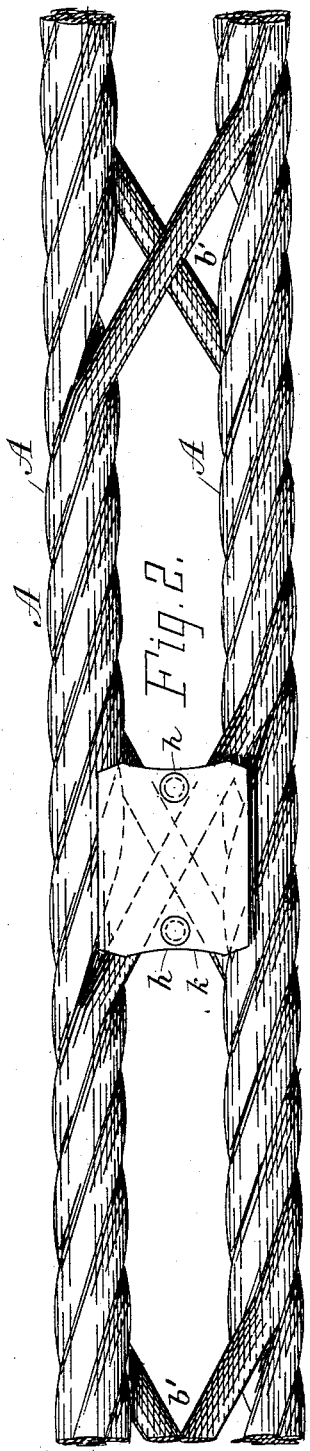
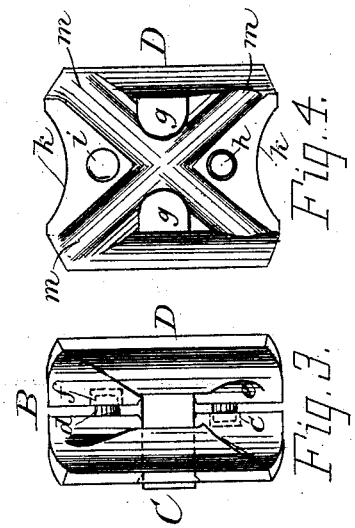
Witnesses.
Francis P. Reilly
Leo Von Rosenberg
Inventor.
Tom. L. Johnson
by D. R. Voorhees
Atty (No Model.) 2 Sheets—Sheet 2.
T. L. JOHNSON.
DOUBLE CABLE FOR CABLE RAILWAYS.
No. 310,285. Patented Jan. 6, 1885.
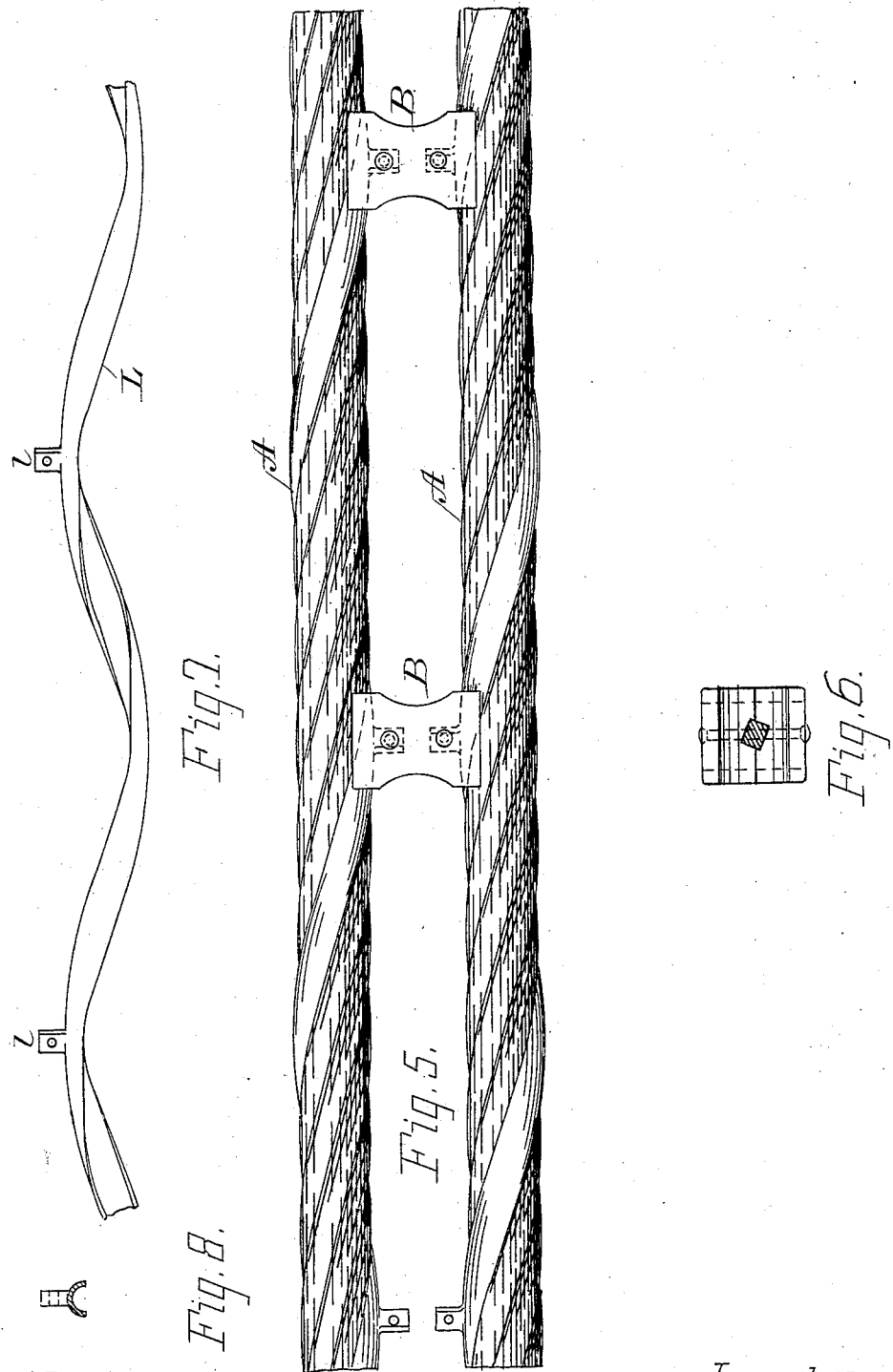
Witnesses,
Francis V. Reilly
Leo Von Rosenberg
Inventor
Tom L. Johnson
by P. R. Voorhees
atty.

UNITED STATES PATENT OFFICE.

TOM L. JOHNSON, OF CLEVELAND, OHIO.

DOUBLE CABLE FOR CABLE RAILWAYS.

SPECIFICATION forming part of Letters Patent No. 310,285, dated January 6, 1885.

Application filed August 16, 1884. (No model.)

*To all whom it may concern:*

Be it known that I, TOM L. JOHNSON, of Cleveland, in the county of Cuyahoga and State of Ohio, have invented certain new and useful Improvements in Double Cables for Cable Railways, which invention is fully set forth and illustrated in the following specification and accompanying drawings.

The object of this invention is to provide a traction-cable composed of two cables, which shall have sufficient flexibility to pass around its driving-pulleys without angles or kinks, thus preserving unimpaired its original strength and adding greatly to its durability. It is also its object to provide said cables with driving-stops, which can be readily removed without in any manner impairing the strands of the cables or injuring the stops.

The invention will first be herein fully described, and then specifically set forth in the claims.

In the accompanying drawings, Figure 1 shows a double traction-cable united by cross-stops formed of two pieces or parts riveted together and engaging loops or lugs formed in the strands of the cables at regular intervals. Fig. 2 shows a similar cross-stop uniting two cables whose strands interlace or interlay each other diagonally in opposite cables, the two parts of said cross-stop being riveted together and securing the cables together in the same manner as shown in Fig. 1. Fig. 3 is a side view of one of the two parts of a stop slightly apart, showing curved sides which partially encircle the cables. Fig. 4 is a view in plan of the inside surface of one of the parts of a cross-stop, having a steady-pin and hole therein, which engage, respectively, a corresponding hole and steady-pin in the opposite part of the stop. Fig. 5 is a view of a double cable united by stops riveted together; but about or around each cable is wound in a helical path a strip of metal having lugs thereon, through the eyes of which the cross-stops are riveted at regular intervals. Fig. 6 is a side view of one of the cross-stops, showing one of the rivets and the cross-bar of the stop in transverse section. Fig. 7 is a view of one of the helical metal strips detached from the cable; and Fig. 8 is a transverse section of Fig. 7, taken near one of its lugs, showing such lug in end view.

In said figures the respective parts are severally indicated by letters, as follows: The letters A A indicate the two cables forming a double cable. B indicates a cross-stop composed of the two parts C D. Part C has a hole, $c$, and a steady-pin, $d$, and part D a steady-pin, $e$, and hole $f$. The projections $g$ $g$ are formed on each part of said stops, which projections are spanned by the loops or lugs $b$ (shown in Fig. 1) and by the strands at their diagonal crossings. (Shown in Fig. 2 at $b'$.) The parts C D are riveted together by the rivets $h$ $h$ through holes $i$. Said parts are made somewhat concave at $k$, where they come in contact with or are struck by the device—such as a circular disk or other traction device—carried on the car for connecting it with the cable. Said parts are also interiorly formed with diagonal grooves $m$ $m$ and rounded edges of the projections $g$ $g$, so that the strands and the cables are left free to curve around the driving-pulleys in either direction without kink or angle, each side of each of the parts C D, which partly span the cables, being also curved out, with sufficient room left between them and the cable to permit of the free bend of the cable, without kink or angle, in a vertical direction.

In Figs. 5, 6, 7, 8 the strands of the cables are undisturbed, the helical metal strips L passing around each cable, covering the same in helical paths. The stops B, formed of two parts, C and D, riveted together, connect the two cables A A together in the same manner as shown in the preceding figures, except that the rivets $h$ are passed through the eyes of the lugs $l$, formed on the metallic strips L. The flexibility of the two cables is thus preserved in passing over the driving-pulleys, as is hereinafter more fully explained.

In order to more clearly apprehend the advantages of this method of attaching the cables together, a short description contrasting the constructions of double cables heretofore practiced will now be given.

In double cables as heretofore constructed the connections of the stops with the cables have been such that the cables have been more or less embedded within the stops themselves, so that in the passage of the cables around their driving drums or pulleys a series of kinks or angles has been unavoidable. Such cables in passing around the main drum do so under a tension of many tons; hence if provided with cross-stops at, say, six inches apart, with a cable running, say, sixteen hours per day, at a speed of eight miles per hour, there would be made in such time more than two and one-half millions of such kinks. The diameters of these driving-pulleys being comparatively large, the angles of these kinks, it is true, are large or obtuse; nevertheless the great tension upon them and their large number operate to very quickly destroy the cable.

Although the wear upon double cables provided with cross bars or stops is very light, from the ordinary modes of grip or other attachment to the car, yet, for the reason above mentioned, the wear upon them is necessarily very great in passing over their driving-pulleys, thus practically rendering the life of such cables very short.

In practice a double cable must retain its flexibility in two planes at right angles to each other, the one vertical and the other horizontal, or, more properly, both normal to and parallel with the direction of travel of the cable, the former in passing over the driving-pulleys and carrying-pulleys, the latter in passing around curves. It is true that occasionally there may exist the need of flexibility in the cable in some other plane; but as the pulleys are generally placed far apart, such flexibility is almost always resolved into one or the other of the two directions mentioned by a slight twist in the cable, either produced naturally by the direction of travel of the driving-pulley, or artificially by specially-constructed mechanism.

In this invention, in the several figures described, it will be observed that although there is a connection between a rigid stop and flexible cables, such connection permits of perfect flexibility of said cables in almost every direction but that of a spiral or a helix, permitting, therefore, free movements of the cables in the desired planes as outlined. In order to secure this flexibility the connection is made outside of the cables proper, and at such points as may be denominated "neutral axes." Moreover, as shown in Figs. 1 and 2, the connection between any given stop and the respective cables is by means of a single strand. By this means any small change in form which may occur at the point of such connection must, with such construction, overcome the resistance of but one strand, instead of that of the whole cable. As no one stop bears more than a small proportion of the strain exerted upon the whole cable, (the load upon any one stop never exceeding that of a single car or train,) the desired increase of flexibility is secured without sacrificing any of the strength desired.

In the modification shown in Figs. 5, 6, and 7 it will be observed that the main cables are left in the usual form, free and flexible in every direction. The helical shield L, carrying the lugs $l$, by means of which lugs connection is made between the cables, is, it will be seen, entirely independent of the cables themselves, being of such form as to follow with equal flexibility every motion of the cables, and at the same time to relieve them of all wear from contact with the peripheries of either the driving-pulleys or the carrying-pulleys. Said shield has the further advantage of being easily removed and renewed by others when necessary. The cables, it will be observed, are thus constructed entirely separate from and free and independent of the stops. Said stops are made preferably in two pieces connected together and to the cable by means of rivets; but said rivets merely pass through special constructions provided therefor outside of the strands proper in the construction of the cables. They in no sense puncture the cable or pass between its strands, or in any way disarrange its original construction. The cross-stops do not surround the cables proper at any point, hence can be removed or replaced without in any way affecting the cables. It will be further observed that although the rivets are used to connect together the two pieces of which the stops are composed, as well as to secure said stops to the cables, yet said rivets take but a passive part in the work of the propulsion of the car. When the cable-connecting mechanism comes in contact with the stops, the stops resist the strain thrown upon them by said mechanism by transmitting such strain to the lugs, loops, or strands above described, which devices effect an even bearing on the surface of the respective cables forming the double cable, and in the case of the interlaid strands (shown in Fig. 2) so apply the strain to said strands as to increase their contact or tightness of lay (within their proper places in the respective cables) with the other strands of their respective cables.

Having thus fully described my said improvements in double traction-cables, and distinguished the same from other double cables, I do not herein broadly claim a double traction-cable for cable railways; but

As of my invention I claim—

1. In a cable-railway system, in combination with one or more driving pulleys or wheels, a traction-cable composed of two cables formed into a double cable, and provided at regular intervals with cross stops or bars secured thereto by exterior fastenings only, whereby said cable is adapted to wind or coil over or around said pulleys without angles or kinks and in a path true to the curve of the peripheries of said pulleys, substantially as and for the purposes set forth.

2. In a cable-railway system, a double traction-cable composed of two cables exteriorly provided with loops or lugs at regular intervals, and connected by means of said loops or lugs to cross bars or stops, substantially as and for the purposes set forth.

3. In a cable-railway system, a double traction-cable composed of two cables provided with lugs secured at regular intervals to strips of metal encircling said cables in helical paths and united by cross stops or bars, substantially as and for the purposes set forth.

TOM L. JOHNSON.

Witnesses:
 FREMONT HILL,
 ENOCH L. STRICKER.